June 4, 1935. LE ROY D. KILEY 2,004,074
APPARATUS FOR AND METHOD OF RECOVERING VAPORS VENTED FROM STORAGE TANKS
Filed Aug. 21, 1933 2 Sheets-Sheet 2
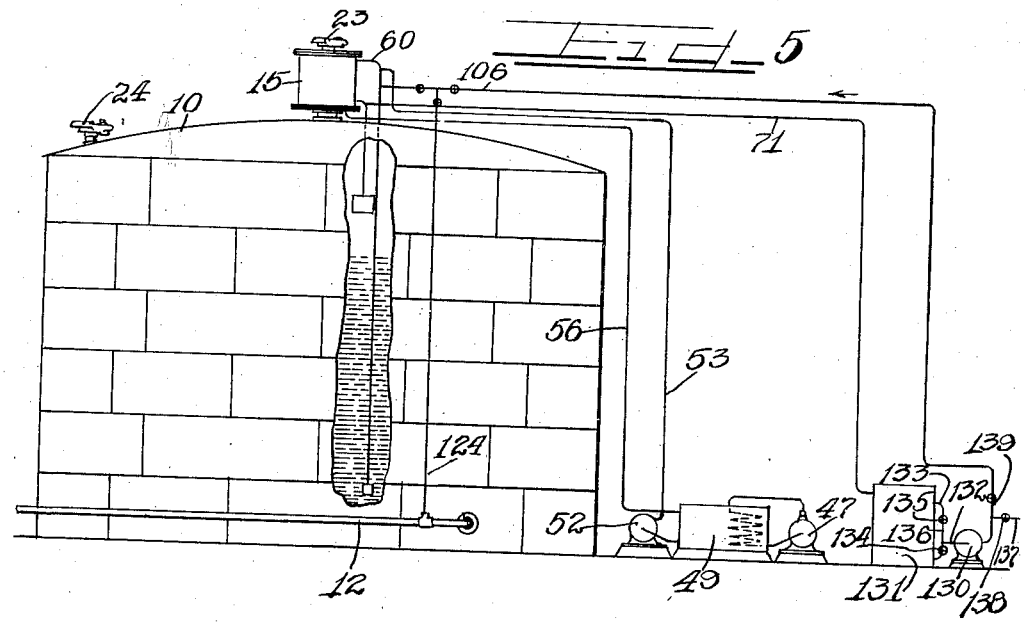
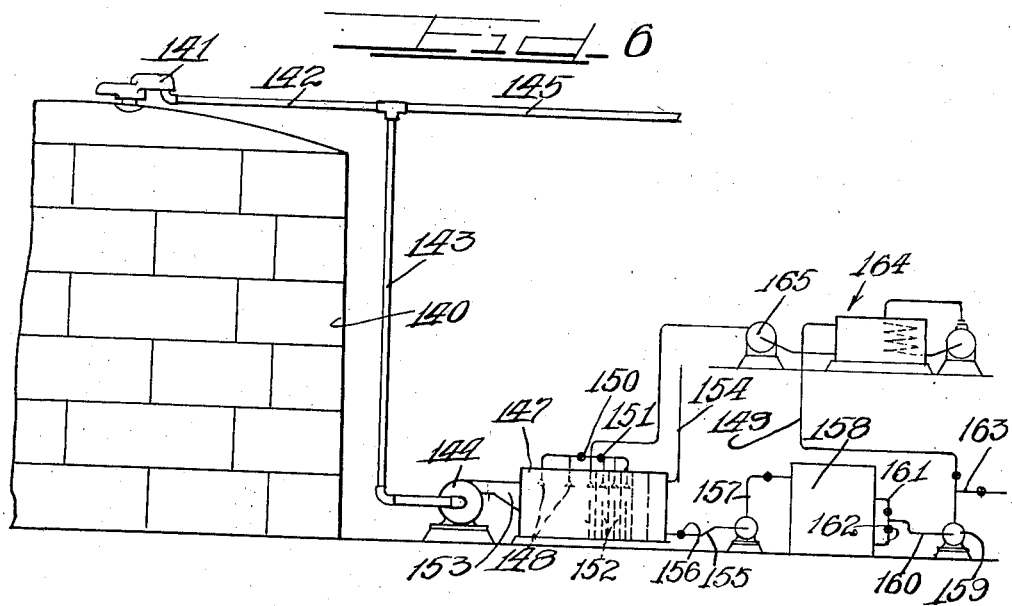
Inventor
Le Roy D. Kiley.
By Charles H. Wills
Attys.

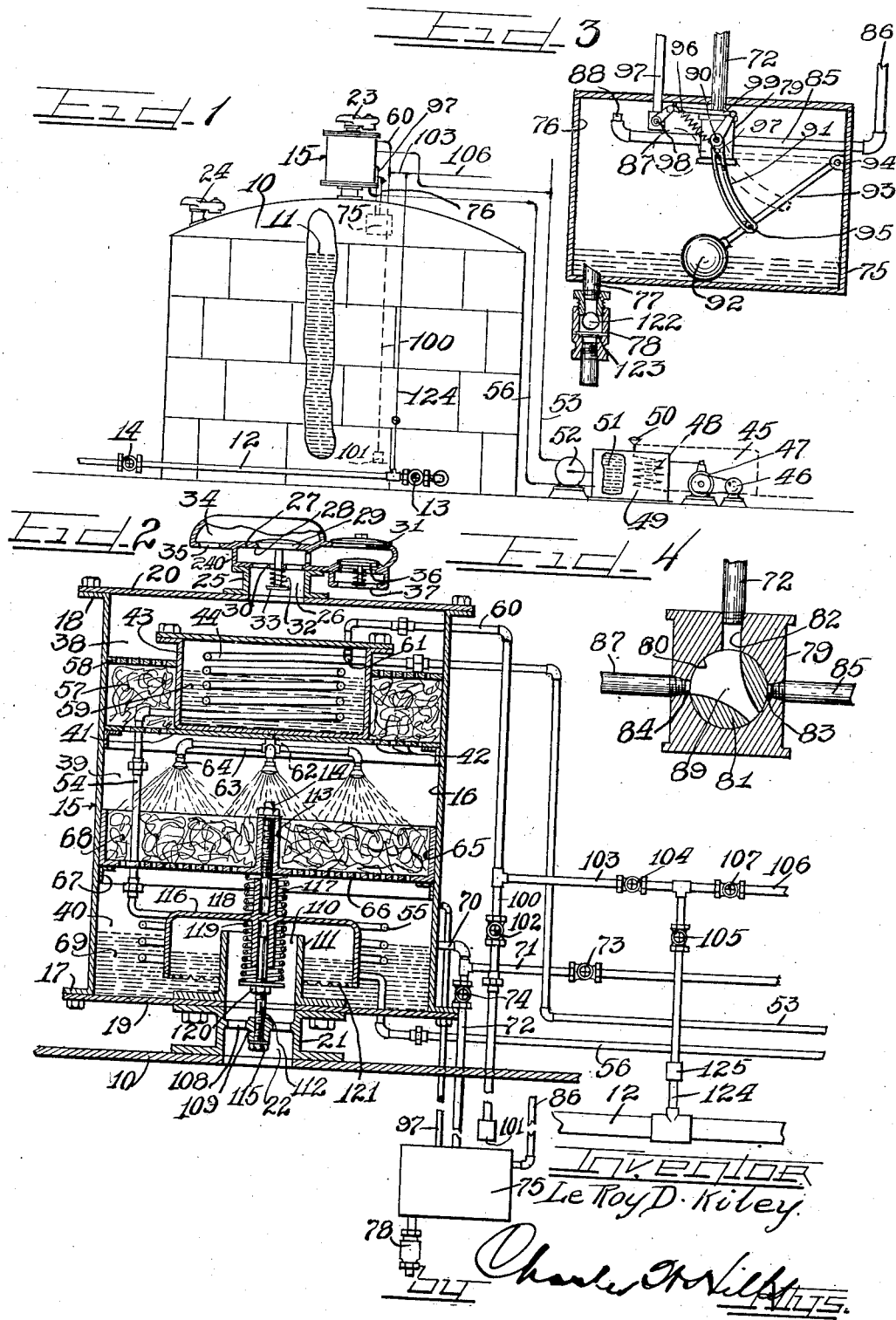

Patented June 4, 1935

2,004,074

UNITED STATES PATENT OFFICE 2,004,074

APPARATUS FOR AND METHOD OF RECOVERING VAPORS VENTED FROM STORAGE TANKS

Le Roy D. Kiley, Larchmont, N. Y.

Application August 21, 1933, Serial No. 686,179

19 Claims. (Cl. 220—85)

This invention relates to an apparatus for and to a method of recovering vapors vented from storage tanks that are used for the storing of volatile liquids, such as gasoline, naphtha, and the like.

Unless suitable measures were taken to prevent it, very considerable losses of vapor from storage tanks containing volatile liquids would occur due to the necessity for venting such tanks to permit "breathing" and also to permit them to be filled. So-called "breathing" occurs because of changes in climatic temperature to which the tanks and their contents are subjected. Since the usual storage tanks for gasoline and other volatile liquids are not built to withstand considerable pressures, the tanks must be provided with vents to equalize the vapor pressures within the tanks with that of the atmosphere independently of the temperature conditions to which the tanks and their contents may be subjected.

Various methods have been employed to prevent the loss of valuable vapors from storage tanks containing volatile liquids. One method employed has been to vent the vapors from a storage tank into a separate breather tank or receiver of large capacity. Another method has been to hold the storage tank under pressure up to a certain point and then permit it to vent freely to the atmosphere or to a special receiver as aforementioned. Storage tanks have also been specially built with a so-called "pontoon or floating roof" which actually rides on the surface of the liquid in the storage tank, rising and falling with temperature changes and thus eliminating the vapor space ordinarily existent in a closed or tight roof tank.

All of these methods of preventing loss of vapors from storage tanks are comparatively expenive. Furthermore, the floating type of roof construction does not provide a positive seal between the inside walls of the tank and the pontoon roof, thereby presenting an exposed, wetted surface when the liquid level falls within the tank, with consequent loss of vapors by evaporation. Such construction also permits to some extent rain, snow, dust, and the like, to find its way past the pontoon into the contents of the tank.

The present invention provides a means for venting storage tanks without substantial loss of valuable vapors and through the use of a comparatively small apparatus, which may be adapted to a single tank, or by slight amplification, so constructed as to care for a battery of tanks, such as are found on tank farms or large storage plants.

According to my invention, vapor loss from storage tanks is prevented by contacting the vapor with a refrigerated fluid so as to condense the vapor and make possible its recovery in liquid form. My invention further contemplates the utilization of a pressure differential between the vapor content of the storage tank and of a receiver, as produced by a temperature differential maintained by the use of a refrigerated condensing fluid, to operate the recovery system automatically.

While it has been known to employ refrigeration in an attempt to condense escaping vapors, such as those from gasoline storage tanks, the recovery of vapors vented from storage tanks cannot be efficiently carried out merely by refrigerating such vapors. Gasoline vapors, particularly when mixed with air, tend to maintain their gaseous state even when subjected to low temperature. This is a phenomenon commonly observed in connection with the carbureting of gasoline in the operation of internal explosion engines. The gasoline is vaporized even in the coldest weather sufficiently well to permit the engine to function, although not perhaps efficiently.

It is an object of this invention to provide an apparatus for and a method of recovering vapors vented from storage tanks in a relatively simple and economical manner. Not only does my invention make possible the recovery of vapors that otherwise would be lost, but in the case of inflammable, or otherwise dangerous or noxious fumes, through preventing the escape thereof to the air, it eliminates possibly serious fires or human hazards.

It is a further important object of this invention to provide a method of and means for recovering light vapors from storage tanks by condensing such vapors with a refrigerated liquid either obtained after cooling the liquid withdrawn from the storage tank or liquid from an external system.

It is a further important object of this invention to provide a device for attachment to storage tanks containing volatile liquids that is operated by means responsive to a differential vapor pressure to automatically recover vapors vented to said device and return the condensed vapors to the storage tank.

It is a further important object of this invention to provide a method of and means for recovering vapors normally vented from storage tanks by condensing such vapors by contact with a refrigerated liquid that may be either the liquid contained within the storage tank or a liquid separately introduced into the system.

Other and further important objects of this invention will be apparent from the disclosures in the specification and the accompanying drawings.

This invention (in a preferred form) is illustrated in the drawings and hereinafter more fully described.

On the drawings:

Figure 1 is an elevational view of a storage tank having attached thereto a device embodying the principles of my invention, with parts broken away and in section.

Figure 2 is an enlarged longitudinal sectional view of the device of my invention, with parts in elevation.

Figure 3 is an enlarged detail view of a float operated valve mechanism.

Figure 4 is an enlarged detail view of a valve forming a part of the mechanism shown in Fig. 3.

Figure 5 is an elevational view of a storage tank with a modified form of my device attached thereto.

Figure 6 is a fragmentary view of a storage tank with a device attached thereto forming a further modification of my invention.

In Figures 1 to 4 inclusive, there is shown apparatus embodying the principles of my invention in its preferred form. The reference numeral 10 indicates a conventional type of closed roof storage tank for containing a volatile fluid, such as indicated at 11. Said tank 10 is provided for connection near the bottom thereof with a supply and draw-off pipe line 12 having control valves 13 and 14 therein. Said pipe line 12 serves for the introduction of liquid into the storage tank 10 and also for the withdrawal of liquid from the tank.

A vapor recovery device of my invention, indicated by the reference numeral 15 is shown as mounted on the roof of said tank 10. Said device 15 comprises a cylindrical shell 16 provided at its ends with peripheral flanges 17 and 18 for the attachment of bottom and top plates 19 and 20, respectively. A flanged connecting member 21 supports said device 15 on the roof of the tank 10 and also provides a passage 22 for vapor communication between the interiors of the tank 10 and device 15.

Both the device 15 and the tank 10 are provided with conventional inlet and outlet gas vents, indicated by the reference numerals 23 and 24, respectively. Since these vents are substantially identical, only one need be described. The vent 23 comprises a chambered member 240 attached to the top plate 20 by means of a flanged connection 25 providing a passage 26 in communication through an aperture in said top plate 20 with the interior of said device 15. The member 240 is provided with an apertured partition 27 forming a seat 28 for a valve 29. A spider 30, forming a part of said member 240, provides a guide for the stem 31 of said valve 29. A light, helical spring 32 is positioned between said spider 30 and a retaining head 33 on said valve stem 31 to retain the valve in seated position.

When the valve 29 is raised, as by sufficient gas pressure to overbalance the compression of the spring 32, gas from the interior of said device 15 is vented through the passage 26, around said valve into an upper chamber 34 and thence through an aperture 35 to the atmosphere.

Said chambered member 240 is also provided with an air intake valve 36 that is spring retained in its seat to control a passage 37 opening to the atmosphere. When the valve 36 is raised, as occasioned by a reduction in pressures within the device 15 sufficient to overcome the weight of the valve and the compression of the spring, air is admitted through the passage 37 into the chambered member 240 and thence through the passage 26 into said device 15.

The receptacle 15 may be considered as being divided internally into an upper cooling space 38, an intermediate spray space 39 and a lower condensate space 40. A partition 41, which is peripherally provided with apertures 42, divides the spray space 39 from the cooling space 38 and also affords a support for a cooling chamber proper, 43. Said cooling chamber 43 comprises a closed vessel in which are mounted refrigerant coils 44 for the circulation of brine or other suitable refrigerant therethrough.

A suitably located small refrigeration machine 45 serves to supply the refrigerant to the coils 44. Said machine 45 comprises a motor 46, a compressor 47, an expansion coil 48 mounted within a brine tank 49, and a conventional thermostatic control 50 in the refrigerant line to maintain the temperature of the brine 51 within said tank 49 at the desired temperature. The brine or other cold transfer fluid is supplied by means of a pump 52 and piping 53 to said coils 44 within the cooling chamber 43. From the coils 44, a return line 54 leads to a second set of coils 55 positioned in the condensate space 40 and thence out of the device 15 by means of piping 56 back to said tank 49.

The annular space surrounding the cooling chamber 43 and above the partition 41 is packed with metal wool 57, which is held in place by an upper perforated partition 58. Said metal wool 57 is cooled by contact with the walls of the chamber 43 and serves as an additional means for condensing vapors that may pass into contact therewith.

The cooling chamber 43 is adapted to be supplied, by means later to be described, with a liquid 59 to be cooled. For this purpose, the liquid is introduced through piping 60 for discharge out of an open end 61 of said piping positioned within the chamber 43 and near the top thereof. After being cooled by contact with the coils 44, the liquid 59 passes out through an opening 62 extending through the bottom of said chamber 43 and through said partition 41 into a series of branch pipes 63. Each of said pipes 63 terminates in a nozzle 64 that serves to direct a spray of cooled liquid downwardly through the spraying space 39. A basket or tray 65, having a perforate bottom 66 and supported by angle pieces 67 from the cylindrical shell 16, is positioned directly beneath said nozzles 64. Said tray 65 may be suitably filled with non-corrosive, metallic wool 68 for receiving the sprayed cooling liquid and for exposing large surfaces thereof to any vapors passing up through the perforated partition 66.

The cooling liquid and any condensate that may be formed passes through the perforations of the partition 66 into the condensate space 40, where it collects as a body of liquid 69 up to the level of an overflow pipe 70. Said overflow pipe 70 is connected by means of a pipe 71 to an external cooling liquid system, or by means of a pipe 72 back into the tank 10. Valves 73 and 74 in said pipe lines 71 and 72, respectively, control the return of cooling liquid and condensate.

The return line 72 leads through the roof of the tank 10 to a trap, indicated generally at 75, which is positioned within said tank. Said trap 75, as is best shown in Fig. 3, comprises a closed container 76 provided at its bottom with a discharge pipe 77 that opens directly into said tank 10. A check valve 78 is provided in said discharge pipe 77 to permit the flow of liquid out of said trap 75 but to prevent any back-flow of liquid into said trap. The discharge end of the pipe 77 is normally above the level of the liquid 11 within said tank 10.

The pipe 72 carries at its lower end, within said receptacle 76, a rotary valve member, indicated generally by the reference numeral 79. Said valve member 79 comprises a block having a transverse bore 80 in which is oscillatably mounted a plug 81 for controlling a passage 82 in alignment with the pipe 72 and other apertures 83 and 84 positioned at 90° from said first aperture 82. A pipe 85 is threaded at one end into said aperture 83 and extends through said receptacle 76 to provide a vent, as at 86, into the vapor space above the liquid 11 within the tank 10. Similarly, a pipe 87 threaded into the aperture 84 provides a vent 88 within said receptacle 76 above the normal liquid level therein.

The plug 81 is provided with a passage 89 adapted to span either the openings 82 and 84 or the openings 84 and 83. Said plug 81 is provided with a stem 90 that extends outside of the valve member 79. A slotted curved link 91 is connected to said stem 90 to permit oscillation of the same when the link is moved beyond certain limits, as hereinafter explained.

A float, comprising a ball 92 and a ball arm 93, is hingedly supported at the end of said arm 93, as at 94, from a wall of the casing 76. Said arm 93 carries a pin 95 that extends into the slot of the link 91 and is confined therein for causing operation of the valve mechanism by means of said float. A tension spring 96 is secured at one end to the upper wall of said casing 76 and at the other end to a pin 200 on said slotted link 91 and adjacent the plug stem 90. The position of the spring 96 is such that whenever the operation of the float, as by the raising or lowering of the ball 92, moves the slotted link 91 to either side of dead center, said spring 96 snaps said slotted link 91 further in its direction of movement to oscillate the plug 81 in one direction or the other.

A vent pipe 97 connects the vapor space above the level of the liquid 69 in the condensate space 40 to the interior of the trap 75. A valve 98 (Fig. 3) is mounted on the end of said vent pipe 97 within said casing 76 and above the liquid level therein. The plug of said valve 98 is connected by a linkage 99 to the extended stem 90 of the plug 81 in such manner that upon oscillation of the plug 81, the plug of valve 98 will also be similarly oscillated.

As previously explained, the liquid to be refrigerated for condensing vapors within the device 15 may be either liquid that has been withdrawn from the tank 10, or it may be liquid similar to that within the tank 10, or liquid of a different type from an external system. The means for withdrawing liquid from the supply within the tank 10 comprises a pipe 100 connected to the pipe 60 and extending through the roof of the tank 10 for connection to a check valve 101 located near the bottom of said tank 10. A valve 102 is positioned in said pipe line 100.

A branch pipe 103, having therein a valve 104, connects with the pipes 60 and 100 and also with the main supply pipe 12 through pipe line 124, containing valve 105 and check valve 125. This permits liquid from the pipe 12 to be introduced directly into the cooling chamber 43. A further branch piping 106, having a valve 107 positioned therein also connects with the branch piping 103 and by means of the pipe 60 to the interior of said cooling chamber 43, so as to permit a foreign fluid of a different type to be introduced into the cooling system.

Returning now to the vapor portion of the system, vapors from the interior of the tank 10 may, under certain circumstances, pass upwardly through the passage 22 and through openings 108 in a supporting spider 109 (Fig. 2) into a throat 110 of an upright seat member 111. A bell 116 is adapted to seat on said member 111 to close said passage 22 when the recovery device is inoperative. A rod 112, threaded at its lower end for longitudinal adjustment in the spider 109, extends upwardly into a recessed boss 180 projecting downwardly from the bottom of the bell 116. A second rod 181, threaded into a central hub 113 of the bottom 66 of the tray 65, extends downwardly into a recessed boss 117 on the top of the bell 116. Nuts 114 and 115, at the upper and lower ends of said rods 181 and 112, respectively, secure the rods in their adjusted positions.

The inverted bell 116 is slidably mounted upon the intermediate, unthreaded portions of said rods 112 and 181. A spring 118 is positioned about said boss 117 between the bottom 66 of the tray 65 and the upper surface of the bell 116. Another spring, 119, is positioned about the lower boss 180 between an adjustable nut and washer 120 and the under surface of said bell 116. The springs 118 and 119 are so selected and the nut and washer 120 so adjusted that the bell 116 normally bears against the upper end of the seat member 111 with a predetermined pressure, which is greater than that for which the relief valve 29 is set. Said bell 116 is serrated along its lower edge 121 to facilitate the escape of vapor, when the bell is lifted, from within said bell 116 into the liquid 69 in the condensate space 40. The spring 119 prevents too sudden an impact or shock when the bell seats on the member 111.

When the storage tank 10 is neither being filled nor emptied, but is standing idle although containing a certain amount of liquid in storage, the device above described operates as a breather for the tank. For operation as a breather only, the valve 102 in the pipe line 100 and the valve 74 in the pipe line 72 are open. Valves 104 and 105 are also preferably open, but valves 107 and 73 are closed. The circulating system, represented by the lines 53 and 56 is, of course, open and in operation for flow of the refrigerant.

Assuming an increase in the temperature of the surrounding atmosphere, with consequent warming of the liquid 11 within the tank 10, the vapor pressure within said tank increases to an extent depending upon the pressure setting of the relief valve in the vent 24 and the pressure setting of bell 116. The relief valve 29 in the vent 23 is set to open at a few ounces of pressure, whereas the corresponding relief valve in the vent 24, which is of similar construction, is set to open at a considerably higher pressure depending upon the pressure which said tank 10 is constructed to withstand. The release pressure required to exhaust beyond the bell 116 is greater than the release pressure setting of the valve 29, of the vent 23, so that before any venting through the recovery device 15 can take place, there must exist a considerably higher vapor pressure within the tank 10 than within the receptacle 15. The release pressure of the bell 116 is, however, lower than the release pressure of the vent unit 24, so that venting is always through the vent 15, except in an emergency where extreme pressure might be encountered.

The vapor tending to escape from the tank 10 builds up a pressure under the bell 116 until the pressure is sufficient to lift said bell off of its seat, but not causing opening of the vent unit 24, whereupon the flow of vapor displaces the liquid from within said bell 116 sufficiently to permit the escape of vapor through the serrations of the lower edge 121 of said bell. Any vapor that is not condensed in passing through the liquid seal afforded by the body of liquid 69 around the bell 116, passes upwardly out of said body of liquid into the space thereabove. The cooling coils 55, however, which surround the bell 116, tend to keep the body of liquid 69 at a lowered temperature so as to effect a considerable condensation of such vapors as they pass out from under the bell 116.

The vapors next pass through the perforated bottom 66 of the tray 65 and into contact with the wetted surfaces of the metal wool 68. Any still uncondensed vapors, in their upward passage, must still pass through the sprays of refrigerated liquid discharged from the nozzles 64. Still further condensation of vapors may be effected by contact of the vapors with the metal wool 57 as the vapors pass upwardly through the perforations 42 and the perforated partition 58 into the cooling space 38. The metal wool 57 is maintained in a cooled condition due to the absorption of heat by the cooling chamber 43.

By the time the vapors have reached the free space above the partition 58, practically nothing but air or other non-condensable gases remain for venting past the valve 29 and out of the opening 35.

In addition to maintaining a temperature differential between the contents of the device 15 and the contents of the storage tank 10, the cooling system also effects such a reduction in vapor pressure, due to the condensation of the vapors in the device 15, that the vapor pressure within said device is substantially lower than the vapor pressure within the tank 10. Consequently, the loss of vapor from the recovery device 15 is practically negligible.

Due to the gas pressure differential between the interiors of the device 15 and tank 10, the check valve 101 at the lower end of pipe 100 opens to permit a flow of liquid from said storage tank 10 up through the pipe 60 into the cooling chamber 43. The liquid is cooled by contact with the coils 44 and, since the cooling chamber 43 is closed except for its bottom outlet, the refrigerated liquid is forced by the same differential pressure, aided by gravity, out through the branch pipes 63 for discharge through the nozzzles 64. The refrigerated liquid trickles through the metal wool 68 and the perforated partition 66 into the condensate space 40, where it collects to the level of the overflow pipe 70.

If, as assumed, the circulation is to be back into the tank 10, the valve 73 will be closed and the valve 74 opened to permit flow of the condensate into the trap 75. With the float ball 92 in its downward position, as shown in Fig. 3, the valve 98 will be open to vent the vapor in the casing 76 through the pipe 97 into the condensate space 40 above the level of the liquid 69 therein and thus equalize the vapor pressures within the trap and within the receptacle 15. The trap 75 need not be positioned within the tank 10.

The valve 79 will also be in the condition illustrated in Fig. 4 when the float ball 92 is in its downward position. Accordingly, the condensate entering the valve 79 from the pipe 72 flows through the passage 89 in the plug 81 and out through the pipe 87 for discharge through the open end 88 of said pipe.

As the level of the liquid within the casing 76 rises, the ball 92 also rises and causes the slotted link 91 to move upwardly until it passes its dead center position, as determined by the alignment of the points of connection of the spring 96 and the extended end 90 of the valve plug 81. When the slotted link 91 passes up beyond this dead center, the tension of the spring 96 snaps the link 91 up further and causes rotation of the plug 81 to open the ports 83 and 84 for communication between the pipes 85 and 87.

In this position of the valve 79, the pipe 85, having an opening 86 into the vapor space within the tank 10, is in vapor flow communication through the pipe 87 with the vapor space within the trap 75, while the flow of liquid through the pipe 72 is cut off by the valve plug 81. Under these conditions, the vapor pressures within the tank 10 and within the trap 75 are equalized and the liquid within said casing 76 is free to discharge through the check valve 78, by gravity, into the tank 10.

The check valve 78 is provided with a light ball 122 that normally seats to prevent upward flow of liquid from the tank 10 into the casing 76, but which, when the trap 75 is discharging, drops free of its seat onto a pin 123, or other raised support, to provide for downward flow of the liquid out of the lower end of the pipe 77 into the body of liquid within the tank 10.

As soon as the trap has emptied itself, the ball float 92 has again reached its downward position and has swung the slotted link 91 into its downward position past dead center, thereby permitting the spring 96 again to act to rotate the plug 81 into the position shown in Fig. 4 and open the valve 98. The cycle is thus automatically repeated so long as the vapor pressure within the tank 10 is sufficient to cause a flow of vapor out from under the bell valve 116 and to cause a flow of liquid up through the check valve 101 into the recovery system. Should the vapor pressure within the tank 10 drop, as would be the case if the temperature of the liquid 11 becomes lower, then a point is reached at which the vapor pressure is insufficient to raise the bell 116 off of its seat on the member 111 and no flow of vapor into the recovery device 15 will take place. Similarly, there will be no flow of liquid through the check valve 101 and pipes 100 and 60 into said device 15.

The condition of the system when the tank 10 is active and is first unloaded and then reloaded with liquid, is as follows. As the liquid 11 is withdrawn through the valve 13 and pipe 12, the vent 24 permits an inrush of air into the vapor space within the tank 10. With reference to the recovery device 15, the bell 116 seats on the member 111 to shut off communication with the tank 10. This prevents any great inrush of air past the valve 36 in the vent 23 into the recovery device 15. After the contents have been withdrawn from the tank 10, the tank 10 is again in condition for reloading.

At this point, there may be a slight vacuum effect existing within the tank due to retardation of the inflow of air through the vent 24, the inlet of which is exactly the same type as that of the inlet valve 26 of the vent 23. Owing to this slight reduction of pressure within the tank 10, vaporization of the volatile liquid within the tank 10 is accelerated. This is particularly true in the case of the lighter and therefore most valuable fraction of the liquid, so that by the time the tank 10 has been drained of its liquid content, it will be full of these light vapors. Ordinarily, when the tank is filled again, these vapors would be blown out of the tank after the pressure reached the blow-off setting of the vent 24, but with my recovery device installed in place on the tank, this loss does not occur because the vapors are recovered in the manner already described.

There is, however, a change in the condition of the recovery system that occurs automatically when the tank 10 is being reloaded. Under these circumstances, since the valves 105 and 104 are open and the valve 107 closed, the pressure of the liquid being pumped into the tank 10 through the pipe 12 is sufficient to cause a flow up through the pipe 124 and past the check valve 125, through pipes 103 and 60, into the cooling chamber 43 and thence to the spray heads 64. Thus, at the time when the tank is being loaded, a more positive and faster flow of liquid takes place directly from the supply line 12 for use in the recovery process. This is important since at the same time vapors are being displaced from the tank 10 at a greater rate than when the tank is merely breathing and the load on the recovery system is therefore much greater.

If it is desired to use a secondary liquid in the condensing system, that is a liquid other than that constituting the contents of the tank 10 or of the supply line 12, valves 105, 102 and 74 are left closed, so as to cut out the trap mechanism 75 and provide a circuit that is separate from the tank 10 and the supply line 12. With this arrangement, a liquid may be used which will both dissolve and condense the recovered vapors, or a different type of liquid may be used which will condense the recovered vapors but will not be miscible therewith.

Fig. 5 illustrates a modified form of recovery apparatus that is especially suited for the separate recovery of the condensed vapors. As shown in Fig. 5, the arrangement of recovery device 15 with respect to the tank 10 is substantially the same except that the pipe lines 106 and 71 are connected up to a pump 130 and a storage tank 131, respectively. Said pump 130 is connected on its intake side by means of a pipe 132 and branch pipes 133 and 134 to said storage tank 131. Valves 135 and 136 are provided in the lines 133 and 134, respectively, to permit the pump to draw liquid from the storage tank 131 through either of the branch lines 133 and 134. This is an advantage when a non-miscible cooling liquid, such as water, is used, since the operator can draw off either the water or the lighter liquid on top of the water by manipulating the valves 135 and 136. A pipe line 137, having a valve 138 positioned therein, is connected to the pump discharge line 106, so that when an excess of condensate is collected in the storage tank 131, such excess can be pumped off to another storage tank. During this operation, the valve 139 in the pipe line 106 and the valve 136 are closed.

In Fig. 6 there is shown a still further modification of my invention, in which the reference numeral 140 indicates a main storage tank for volatile liquids. Said tank 140 is provided with a vent 141, similar to the vents 23 and 24, but in this case, the exhaust opening of said vent 141 is connected by means of a pipe 142 and piping 143 to the intake side of a blower 144. Said blower 144 may serve a battery of tanks similar to tank 140 for drawing off the vapor from such tanks through the pipe 142 and other pipes 145 to a central recovery system.

Said recovery system comprises a unit 146, which may take the form of a long chamber 147 provided with a series of spray heads 148. A refrigerated liquid is supplied to said spray heads from a refrigerator unit 164 connected in a main liquid supply line 149. Said spray heads 148 may be arranged in series that are controlled by valves 150 and 151 for operation, or not, as desired. The chamber 147 is provided with a plurality of vertical baffles 152 arranged in staggered relation so as to provide a tortuous path for the vapors introduced into said chamber from the blower 144 through a connecting conduit 153. The non-condensable gases are vented from the chamber 147 through a vent pipe 154.

The condensed vapors and condensing liquids which collect in the chamber 147 are withdrawn therefrom through a valved pipe 155 by means of a pump 156 and delivered through a discharge pipe 157 into a storage tank 158. A second pump 159, connected to the tank 158 by piping 160 and valve branch pipe lines 161 and 162, serves to withdraw liquid from the tank 158 and pump it to the refrigerator unit 164, from which it is delivered by a pump 165 to the spray heads 148. Any excess of liquid in the recovery system is pumped to a further receiving station through the valved line 163.

In view of the automatic thermostat on the refrigerator unit, the liquid supplied to the spray heads 148 will be refrigerated to an extent sufficient to permit an efficient condensation of the vapors delivered to the unit 146 from the blower 144. Condensation of these vapors will take place by reason of contact of the vapors with the refrigerated sprayed fluid and also with the wetted surfaces of the baffles 152.

It will be apparent that in its preferred form, my invention contemplates an apparatus for the automatic recovery of valuable vapors from storage tanks containing volatile liquids, whereby the naturally and normally occurring conditions within the storage tanks themselves, create the motivating force necessary to operate the recovery system. Such operation of the recovery system therefore requires very little attention by operators and, as a result, is relatively economical.

The efficiency of the recovery system is due in large measure to the use of a refrigerated liquid for effecting the condensation of the vapors to be recovered. Such use of refrigerated condensing liquids not only serves by contact with the vapors themselves to condense such vapors more efficiently, but also by lowering the temperature within the recovery device, to create a lower vapor pressure within the recovery device and thus further reduce loss of vapor from the system.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. Apparatus for venting a tank containing a volatile liquid, comprising a receptacle for connection to said tank for vapor flow communication therewith, means disposed within said receptacle and in the vapor flow passage therethrough for exposing a refrigerated liquid to said vapor flow, and means providing a vent for non-condensable gases to the atmosphere from said receptacle.

2. Apparatus for venting a tank containing a volatile liquid, comprising a receptacle for connection to said tank for vapor flow communication therewith, means including atomizing nozzles disposed within said receptacle and in the vapor flow passage therethrough for exposing a refrigerated liquid to said vapor flow, and means providing a vent for non-condensable gases to the atmosphere from said receptacle.

3. Apparatus for venting a tank containing a volatile liquid, comprising a receptacle for connection to said tank for vapor flow communication therewith, means disposed within said receptacle and in the vapor flow passage therethrough for exposing a refrigerated liquid to said vapor flow, means providing a vent for non-condensable gases to the atmosphere from said receptacle, and means for automatically returning liquid from said receptacle to said tank.

4. Apparatus for automatically venting liquid storage tanks and recovering vapors therefrom, comprising a receptacle in vapor flow communication with said tank, means within said receptacle for condensing vapors, means providing a vent to the atmosphere for non-condensable gases from said receptacle, a connection for the flow of liquid from said receptacle back to said tank, and means in said connection responsive to the flow of liquid therethrough for automatically returning said liquid to said tank.

5. Apparatus for use with a tank containing a volatile liquid for venting said tank without loss of vapors therefrom, comprising a receptacle in vapor flow communication with said tank, means automatically responsive to pressure conditions within said tank to close and open said vapor communication upon the lowering and raising respectively of pressure within said tank, a liquid distributing means within said receptacle in the path of vapors passing therethrough, means for supplying a refrigerated liquid to said distributing means, and a separating device for receiving liquid from said receptacle having a connection with said receptacle for venting gases thereto and having a valve controlled connection with said tank for returning liquid to said tank.

6. Apparatus for use with a tank containing a volatile liquid for venting said tank without loss of vapors therefrom, comprising a receptacle in vapor flow communication with said tank, means automatically responsive to pressure conditions within said tank to close and open said vapor communication upon the lowering and raising respectively of pressure within said tank, a liquid distributing means within said receptacle in the path of vapors passing therethrough, means for supplying a refrigerated liquid to said distributing means, a separating device for disposition within said tank for receiving liquid from said receptacle and discharging said liquid to said tank, and a float controlled valve associated with said device for automatically discharging said liquid from said device into said tank in accordance with the flow of liquid into said device.

7. Apparatus for use with a liquid storage tank to permit venting thereof without loss of vapors therefrom, comprising a receptacle in vapor flow communication with said tank and having a vent therefrom to the atmosphere, a valve in said vapor flow communication responsive to changes in vapor pressure within said tank to open or close said communication automatically, means disposed within said receptacle in said vapor flow ahead of said vent for condensing vapors, and means for automatically returning the condensate to said tank.

8. Apparatus for use with a liquid storage tank to permit venting thereof without loss of vapors therefrom, comprising a receptacle in vapor flow communication with said tank and having a vent therefrom to the atmosphere, means including atomizing nozzles disposed within said receptacle in said vapor flow ahead of said vent for condensing vapors, and means for automatically returning the condensate to said tank.

9. A breathing apparatus for volatile liquid storage tanks, comprising a vented receptacle for mounting on top of a tank in vapor flow communication through the roof thereof, a valve in said communication responsive to changes in pressure within said tank, means defining a cooling chamber within said receptacle, means responsive to a pressure differential within said tank and said receptacle to draw liquid from said tank into said receptacle for cooling therein, means for atomizing the cooled liquid from said receptacle into said vapor flow to condense the vapor content thereof, and means for automatically returning said liquid to said tank from said receptacle.

10. A breathing apparatus for volatile liquid storage tanks, comprising a vented receptacle for mounting on top of a tank in vapor flow communication through the roof thereof, a valve in said communication responsive to changes in pressure within said tank, means defining a cooling chamber within said receptacle, means responsive to a pressure differential within said tank and said receptacle to draw liquid from said tank into said receptacle for cooling therein, means for atomizing the cooled liquid from said receptacle into said vapor flow to condense the vapor content thereof, and a float controlled trap adapted to be positioned within said tank for automatically returning said liquid to said tank from said receptacle and for venting non-condensable gases back into said receptacle.

11. In a device of the class described, a receptacle having a valve controlled vapor intake and a valve controlled gas vent, means defining a cooling chamber near the top of said receptacle, a conduit for introducing a liquid into said chamber, atomizing nozzles connected to said chamber for spraying cooled liquid therefrom into the flow of vapors from said intake, a layer of material providing an extended surface beneath said nozzles, and an overflow connection for liquid from the lower part of said receptacle.

12. In a device of the class described, a receptacle having a valve controlled vapor intake and a valve controlled gas vent, means defining a cooling chamber centrally positioned near the top of said receptacle, a conduit for introducing a liquid into said chamber, atomizing nozzles connected to said chamber for spraying cooled liquid therefrom into the flow of vapors from said intake, a layer of material providing an extended surface beneath said nozzles, a perforated plate extending between said chamber and the walls of said receptacle for supporting a layer of porous metallic material for contact with vapors beyond said nozzles, and an overflow connection for liquid from the lower part of said receptacle.

13. In a device of the class described, a receptacle having a lower vapor intake and an upper gas vent in gas flow communication therewith, spaced permeable transverse partitions in said gas flow communication for supporting layers of extended surface material, means above one of said partitions defining a liquid cooling chamber, and nozzles above a lower partition for receiving cooled liquid from said chamber and spraying said liquid over said extended surface material.

14. In a device of the class described, a receptacle having a lower vapor intake and an upper gas vent in gas flow communication therewith, spaced permeable transverse partitions in said gas flow communication for supporting layers of extended surface material, means above one of said partitions defining a liquid cooling chamber, nozzles above a lower partition for receiving cooled liquid from said chamber and spraying said liquid over said extended surface material, and valves in said vapor intake and gas vent automatically operated by vapor and gas pressures within the system in which said device may be installed.

15. The method of venting a liquid storage tank, which comprises relieving vapors from said tank when the pressure therein exceeds a predetermined point, preventing vapor escape from the tank until the tank pressure reaches said predetermined point, spraying a refrigerated liquid into the flow of said vapors, venting the non-condensable gases to the atmosphere, and recovering the condensate.

16. The method of venting a liquid storage tank, which comprises relieving vapors from said tank when the pressure therein exceeds a predetermined point, spraying a refrigerated liquid into the flow of said vapors, passing any remaining vapors and non-condensable gases through a bed of extended surface material to effect further condensation of vapor, venting the non-condensable gases to the atmosphere and recovering the condensate.

17. The method of venting a tank containing a volatile liquid, which comprises relieving vapors from said tank in a confined flow when the vapor pressure within said tank exceeds a predetermined point, refrigerating a portion of liquid withdrawn from said tank, atomizing said refrigerated liquid into said vapor flow to condense said vapors, venting the non-condensable gases to the atmosphere and returning the condensate to said tank.

18. A vapor recovery apparatus for storage tanks comprising means providing communication from the tank to said apparatus, means for changing vapor received from said tank into said apparatus to liquid form, and automatically operating mechanism utilizing the vapor pressure within said tank for operation of said apparatus.

19. A recovery apparatus for use on storage tanks containing volatile liquids comprising means for communication between the vapor space of said tank and said apparatus, means for communication between the liquid contents of said tank and said apparatus, and mechanism operating by pressure from within said tank to force liquid from the tank into said apparatus.

LE ROY D. KILEY.